US012661840B2

(12) United States Patent

Hou et al.

(10) Patent No.: US 12,661,840 B2

(45) Date of Patent: Jun. 23, 2026

(54) GRANULATION METHOD AND DEVICE FOR CROSSLINKED POLYETHYLENE CABLE INSULATING MATERIAL HAVING VOLTAGE GRADE OF 500 KV OR MORE

(71) Applicant: ELECTRIC POWER RESEARCH INSTITUTE. CHINA SOUTHERN POWER GRID, Guangzhou (CN)

(72) Inventors: Shuai Hou, Guangzhou (CN); Mingli Fu, Guangzhou (CN); Lei Jia, Guangzhou (CN); Lingmeng Fan, Guangzhou (CN); Yunpeng Zhan, Guangzhou (CN); Wenbo Zhu, Guangzhou (CN); Baojun Hui, Guangzhou (CN); Bin Feng, Guangzhou (CN); Jie Liu, Guangzhou (CN)

(73) Assignee: ELECTRIC POWER RESEARCH INSTITUTE. CHINA SOUTHERN POWER GRID, Guangzhou (CN)

( * ) Notice: Subject to any disclaimer, the term of this patent is extended or adjusted under 35 U.S.C. 154(b) by 0 days.

(21) Appl. No.: 19/107,804

(22) PCT Filed: Dec. 6, 2022

(86) PCT No.: PCT/CN2022/136776

§ 371 (c)(1),
(2) Date: Feb. 28, 2025

(87) PCT Pub. No.: WO2024/045398

PCT Pub. Date: Mar. 7, 2024

(65) Prior Publication Data

US 2026/0001264 A1    Jan. 1, 2026

(30) Foreign Application Priority Data

Sep. 2, 2022    (CN) .......................... 202211071294.8

(51) Int. Cl.
B29C 48/00        (2019.01)
B29C 48/04        (2019.01)
(Continued)

(52) U.S. Cl.
CPC .......... B29C 48/0022 (2019.02); B29C 48/04 (2019.02); B29C 48/37 (2019.02);
(Continued)

(58) Field of Classification Search
None
See application file for complete search history.

(56) References Cited

FOREIGN PATENT DOCUMENTS

| CN | 104568663 A | 4/2015 |
| CN | 104772836 A | 7/2015 |

(Continued)

OTHER PUBLICATIONS

Fluid Mechanics II Viscosity and shear stresses (Year: 2008).*

(Continued)

*Primary Examiner* — Farah Taufiq

(74) *Attorney, Agent, or Firm* — Taft, Stettinius & Hollister LLP

(57) ABSTRACT

Granulation method and device for crosslinked polyethylene cable insulating material having voltage grade of at least 500 kV are provided. The method includes: controlling melt extrusion system to melt insulating material; directing the melt into melt gear pump through first branch flow channel; measuring pressures at inlet and outlet of the melt gear pump, and calculates first pressure difference $\Delta p_1$; rotational speed of melt gear pump is adjusted such that $\Delta p_1$ approximates to 0; measuring pressures at inlet and outlet of capillary mold, and calculate second pressure difference $\Delta p_2$; volume flow rate Q of the melt flowing into capillary mold is obtained based on number of steps of rotation of melt gear pump; shear rate, shear stress and shear viscosity (Continued)

$\eta$ of the melt are obtained based on Q and $\Delta p_2$; and adjusting process parameters, adjusting $\eta$ to obtain adjusted $\eta'$, and causing $\eta'$ to be within processing-suitable viscosity range.

9 Claims, 4 Drawing Sheets

(51) Int. Cl.

| | | |
|---|---|---|
| *B29C 48/37* | (2019.01) | |
| *B29C 48/395* | (2019.01) | |
| *B29K 105/24* | (2006.01) | |
| *B29L 31/34* | (2006.01) | |

(52) U.S. Cl.
CPC .... *B29C 48/395* (2019.02); *B29C 2793/0027* (2013.01); *B29C 2793/009* (2013.01); *B29C 2948/92019* (2019.02); *B29C 2948/92104* (2019.02); *B29C 2948/92333* (2019.02); *B29C 2948/92409* (2019.02); *B29C 2948/9258* (2019.02); *B29C 2948/92704* (2019.02); *B29C 2948/92828* (2019.02); *B29C 2948/92961* (2019.02); *B29K 2023/06* (2013.01); *B29K 2105/24* (2013.01); *B29K 2995/0007* (2013.01); *B29L 2031/3462* (2013.01)

(56) References Cited

FOREIGN PATENT DOCUMENTS

| | | | | | | |
|---|---|---|---|---|---|---|
| CN | 204687152 | U | | 10/2015 | | |
| CN | 206546309 | U | | 10/2017 | | |
| CN | 108285565 | A | * | 7/2018 | ............ | B29B 9/065 |
| CN | 210820341 | U | | 6/2020 | | |
| CN | 217257516 | U | * | 8/2022 | | |
| JP | 2013064081 | A | | 4/2013 | | |

OTHER PUBLICATIONS

Fluid Dynamics (Year: 2021).*
Bernoulli's Equation—University Physics vol. 1 (Year: 2016).*
ISA / CN, International Search Report & Written Opinion issued in corresponding Application No. PCT/CN2022/136776, dated May 19, 2023, 11 pp.
Chinese Patent Office, Office Action issued in corresponding Application No. 202211071294.8, dated Apr. 30, 2025, 8 pp.

* cited by examiner

GRANULATION METHOD AND DEVICE FOR CROSSLINKED POLYETHYLENE CABLE INSULATING MATERIAL HAVING VOLTAGE GRADE OF 500 KV OR MORE

CROSS-REFERENCE TO RELATED APPLICATION

This application is a U.S. National Stage Application, filed under 35 U.S.C. 371, of International Patent Application No. PCT/CN2022/136776, filed on Dec. 6, 2022, which claims priority to Chinese Patent Application No. 202211071294.8, entitled "GRANULATION METHOD FOR CROSSLINKED POLYETHYLENE CABLE INSULATING MATERIAL HAVING VOLTAGE GRADE OF AT LEAST 500 KV AND GRANULATION DEVICE THEREFOR" and filed with the CNIPA on Sep. 2, 2022, the entire contents of which are incorporated herein by reference.

TECHNICAL FIELD

The present disclosure relates to the field of crosslinked polyethylene cable insulating material granulation technologies, and in particular, to a granulation method for a crosslinked polyethylene cable insulating material having a voltage grade of at least 500 kV and a granulation device therefor.

BACKGROUND

Crosslinked polyethylene insulating material is widely used in manufacture of high-voltage cable. The quantity and size of defects such as impurities in the material are key indexes that affect the voltage grade of the material. Higher voltage grade of the material indicates stricter requirements for the indexes. Manufacturing of the crosslinked polyethylene cable insulating material having high voltage grade requires mixing of low-density polyethylene resin and functional additives (antioxidants or other additives other than crosslinking agents) in a molten state according to certain proportions, and then re-granulation is carried out.

During manufacturing of high-voltage crosslinked polyethylene cable insulating material, strict requirements are set for the granulation process. Higher voltage grade of the material indicates more stringent requirements. Reasons are mainly as follows. Firstly, uniformity of material particles is the most basic requirement for evaluating the appearance of the material. If particles of the crosslinked polyethylene insulating material are more uniform, a subsequent extrusion process of cable insulation has better practicality. If a large number of slag particles or strip particles appear in the material, it is easy to cause fluctuations during material extrusion, and even affect microscopic uniformity of an insulation layer, which poses a potential threat to stability of the operation of the cable. Secondly, for the crosslinked polyethylene cable insulating material having a voltage grade of at least 110 kV, in order to prevent gel point defects caused by pre-crosslinking, a crosslinking agent is not allowed to be mixed in a resin extrusion blending stage. The crosslinking agent (dicumyl peroxide (DCP)) is molten into a liquid state by using a liquid-phase impregnation method, and is then added to the material particles mixed with antioxidants by post-absorption. Because of this, in order to ensure that DCP has sufficiently uniform dispersion in the particles, there is a need to ensure that the particles have sufficiently good size uniformity; therefore, the particles must meet a certain size requirement, and large change in particle sizes cannot occur. When the material has higher voltage grade, e.g., a grade of 500 kV, such requirement may become more stringent in order to ensure uniformity of composition of the final insulating material. Thirdly, during the manufacturing, the material is purified with various methods, and eliminating various impurities and defects in the material is a key technology of manufacturing. Generally, impurity particles in the material whose sizes are larger than a certain threshold are filtered out by using a melt filtration technology. The purified material must be clean during subsequent granulation and transportation, and no new impurities and defects can be introduced, to ensure that the material has required performance. For a material having a voltage grade of at least 500 KV, it is not enough to remove impurity particles through only melt filtration. A complete set of monitoring and evaluation systems for cleanliness are also required to evaluate indexes such as defect contents of the material in real time. The material can be regarded as a qualified product only when the indexes are lower than specified thresholds. Otherwise, it can only be downgraded for use. Therefore, during material cleanliness evaluation, scanning and image analysis of a material product after granulation by an optical instrument is an important step, which requires that the material particles must be uniform in size and meet a requirement of an optical inspection system. Impurity testing is a standard for material grading and determines whether the material can be used for a specified voltage grade. Therefore, online detection of impurities in the material particles must have sufficient reliability, which also has a higher requirement for particle size uniformity throughout the manufacturing. Fourthly, avoiding impurities to the maximum extent is a core requirement for the crosslinked polyethylene cable insulating material having a voltage grade of 500 kV. Especially, conductive impurities from metal materials must be strictly avoided. The cutter during the granulation is a metal component that operates under high load for a long time and is prone to wear and tear. In extreme cases, if there is collision or friction between metal parts, metal powder impurities may be mixed into the material, which may greatly affect performance of the material and pose a potential threat to performance of the final cable product, which may inevitably lead to large-scale power outage and heavy economic losses once any problem occurs.

FIG. 1 is a schematic structural diagram of a basic granulation device. As shown in FIG. 1, among the numerical references, 1 is a motor, 2 is a cutter, 3 is a sealing chamber, 4 is a water inlet, 5 is a water outlet, 6 is an orifice plate, 7 is a heating ring, 8 is a melt filter, and 9 is an extruder.

As shown in FIG. 1, a basic process of granulation of the crosslinked polyethylene insulating material in the related technology is to extrude the melt of the material through the orifice plate, carry out granulation by using a rapidly rotating cutter, and then use circulating water for rapid cooling and shaping. In order to ensure that the material particles can be quickly shaped and to prevent reintroduction of foreign impurities, granulation and subsequent material transportation processes are completely carried out in a sealed pipeline environment, and purified deionized water is taken as a cooling and transportation medium. However, this basic granulation process in the related technology still has two shortcomings. Firstly, the material inevitably has fluctuations in the extrusion rate during the extrusion, and the amount of glue is different, while the rotation rate of the cutter does not change accordingly, which makes it difficult to ensure that the particle size and uniformity of the material meet requirements for subsequent optical test or material mixing. Secondly, a small gap is required to be maintained between the cutter and the orifice plate. In long-term continuous manufacturing process, it is extremely difficult to control the gap within an optimal range. In extreme cases, if the cutter collides with the orifice plate and metal fines fall off into the material, metal impurity defects may be introduced into the material, seriously affecting the cleanliness index of the material.

SUMMARY

According to various embodiments of the present disclosure, a granulation method for crosslinked polyethylene cable insulating material having a voltage grade of at least 500 kV and a device therefor are provided.

In a first aspect, the present disclosure provides a granulation method for a crosslinked polyethylene cable insulating material having a voltage grade of at least 500 kV, including a monitoring procedure and a granulation procedure. The monitoring procedure includes following steps.

In step 1, a controller controls a melt extrusion system to melt an insulating material to obtain a melt.

In step 2, the melt extrusion system directs the melt into a melt gear pump through a first branch flow channel.

In step 3, a melt monitoring system respectively measures pressures at an inlet and an outlet of the melt gear pump, and calculates a first pressure difference $\Delta p_1$, $\Delta p_1 = p_2 - p_1$, where $p_1$ denotes a melt pressure at the inlet of the melt gear pump, and $p_2$ denotes a melt pressure at the outlet of the melt gear pump.

In step 4, a rotational speed of the melt gear pump is adjusted to enable $\Delta p_1$ to approximate to 0.

In step 5, the melt monitoring system respectively measures pressures at an inlet and an outlet of a capillary mold, and calculate a second pressure difference $\Delta p_2$, $\Delta p_2 = p_4 - p_3$, where $p_3$ denotes a melt pressure at the inlet of the capillary mold, and $p_4$ denotes a melt pressure at the outlet of the capillary mold.

In step 6, a volume flow rate Q of the melt flowing into the capillary mold is obtained based on a number of steps of rotation of the melt gear pump.

In step 7, a shear rate $\dot{\gamma}$, a shear stress $\tau$, and a shear viscosity $\eta$ of the melt are obtained based on the volume flow rate Q and $\Delta p_2$.

In step 8, the controller adjusts process parameters of the melt extrusion system, adjusts the shear viscosity $\eta$ to obtain an adjusted shear viscosity $\eta'$, and causes $\eta'$ to be within a processing-suitable viscosity range of the melt.

In an embodiment, the granulation procedure includes following steps.

In step 9, the melt extrusion system feeds the melt to an orifice plate through a main flow channel.

In step 10, a rotational speed n of a rotary cutter in a granulation system is adjusted according to $\eta'$.

In step 11, trial extrusion is carried out to determine a safe gap threshold $\delta$ and a pressure coefficient $\varepsilon$.

In step 12, a pressure $p_h$ exerted by a hydraulic press onto the rotary cutter is obtained based on $\delta$, $\varepsilon$, and the pressure $p_4$ at the outlet of the capillary mold.

In step 13, the pressure $p_h$ is exerted by the hydraulic press onto the rotary cutter, to enable a thin melt buffer layer existing between the rotary cutter and the orifice plate, and the melt is granulated.

In an embodiment, a computational formula for the shear rate $\dot{\gamma}$ of the melt in step 7 is:

$$\dot{\gamma} = 10.19Q.$$

In an embodiment, a computational formula for the shear stress $\tau$ in step 7 is:

$$\tau = \frac{\Delta P_2}{160}.$$

In an embodiment, a computational formula for the shear viscosity $\eta$ in step 7 is:

$$\eta = \frac{\tau}{\dot{\gamma}}.$$

In an embodiment, process parameters in step 8 include a host screw rotational speed and a melt temperature.

In an embodiment, the rotational speed n of the rotary cutter in step 10 is obtained according to the following formula:

$$n = \frac{K}{\eta}$$

where K denotes a proportional coefficient, and K is determined according to a trial granulation experiment.

In an embodiment, $p_h$ in step 12 is obtained according to the following formula:

$$P_h = \varepsilon(P_4 - \delta).$$

In an embodiment, the capillary mold has a diameter D ranging from 0.99 mm to 1.01 mm and a length L ranging from 39.9 mm to 40.1 mm.

In a second aspect, the present disclosure provides a granulation device for a crosslinked polyethylene cable insulating material having a voltage grade of at least 500 kV, used in the above computational method, including: a controller, a melt gear pump, a capillary mold, a melt extrusion system, a melt monitoring system, a granulation system, a main flow channel, a first branch flow channel, a second branch flow channel, and a third branch flow channel.

The controller is electrically connected to each of the melt extrusion system, the melt monitoring system and the granulation system respectively, and is configured to control the melt extrusion system, the melt monitoring system and the granulation system.

The melt extrusion system is connected to the granulation system via the main flow channel, and is configured to extrude a melt into the orifice plate through the main flow channel.

The melt extrusion system extrudes the melt into the melt gear pump through the first branch flow channel, the melt gear pump extrudes the melt into the capillary mold through the second branch flow channel, and the capillary mold extrudes the melt into the main flow channel through the third branch flow channel.

The melt monitoring system is configured to respectively measure pressures at an inlet and an outlet of the melt gear pump and pressures at an inlet and an outlet of the capillary mold. The melt monitoring system may include two pressure sensors respectively provided at the inlet and the outlet of the melt gear pump, and two pressure sensors respectively provided at the inlet and the outlet of the capillary mold.

The granulation system is configured to granulate the melt, and the granulation system includes a hydraulic press and a rotary cutter.

The hydraulic press is electrically connected to the controller and is in transmission connection with the rotary cutter, and is configured to provide a set hydraulic pressure for the rotary cutter through control of the controller. The hydraulic press can be a rotary piston, and an output end of the rotary piston is fixedly connected to the rotary cutter.

The rotary cutter granulates, through rotation, the melt flowing out of the orifice plate.

Details of one or more embodiments of the present disclosure are set forth in the following accompanying drawings and descriptions. Other features, objectives, and advantages of the present disclosure become obvious with reference to the specification, the accompanying drawings, and the claims.

BRIEF DESCRIPTION OF THE DRAWINGS

To further clarify technical solutions in embodiments of the present disclosure or related technologies, accompanying drawings used in the description of the embodiments or the related technologies are briefly introduced below. It is apparent that, the accompanying drawings described below are only for some embodiments of the present disclosure, while other drawings can be obtained by those of ordinary skill in the art from the provided drawings without paying creative efforts.

DETAILED DESCRIPTION

Technical solutions of the present disclosure are clearly and completely described below according to embodiments in conjunction with accompanying drawings used in the embodiments of the present disclosure. Obviously, described embodiments are only for some of the embodiments rather than all of the embodiments of the application. Based on the embodiments in the present disclosure, all other embodiments obtained by those of ordinary skill in the art without creative efforts fall within the scope of protection of the present application.

Figure 1:
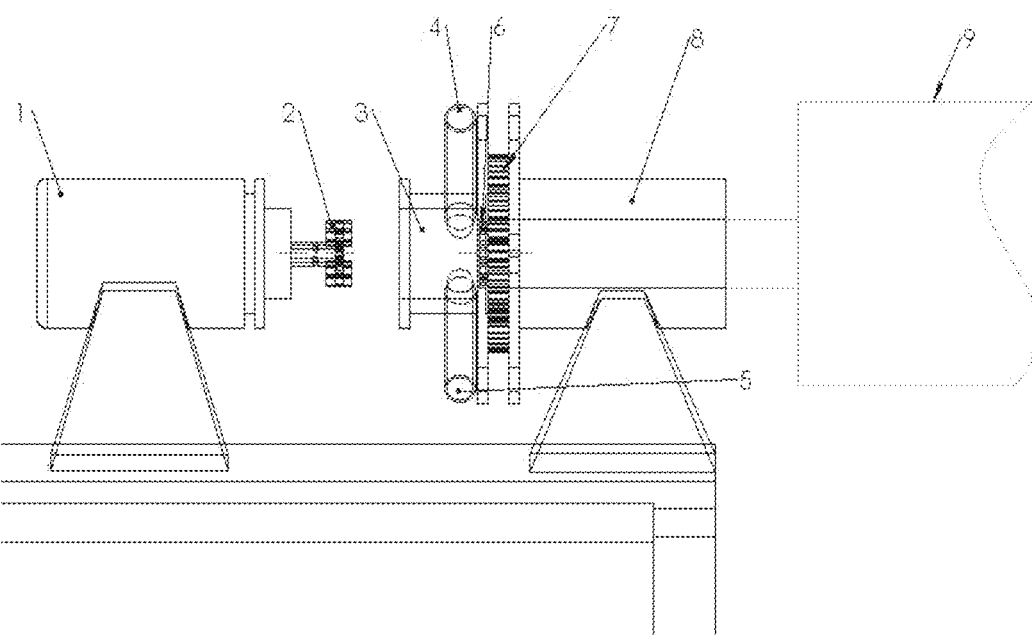
FIG. 1 is a schematic structural diagram of a basic granulation device in the related technology.
Figure 2:
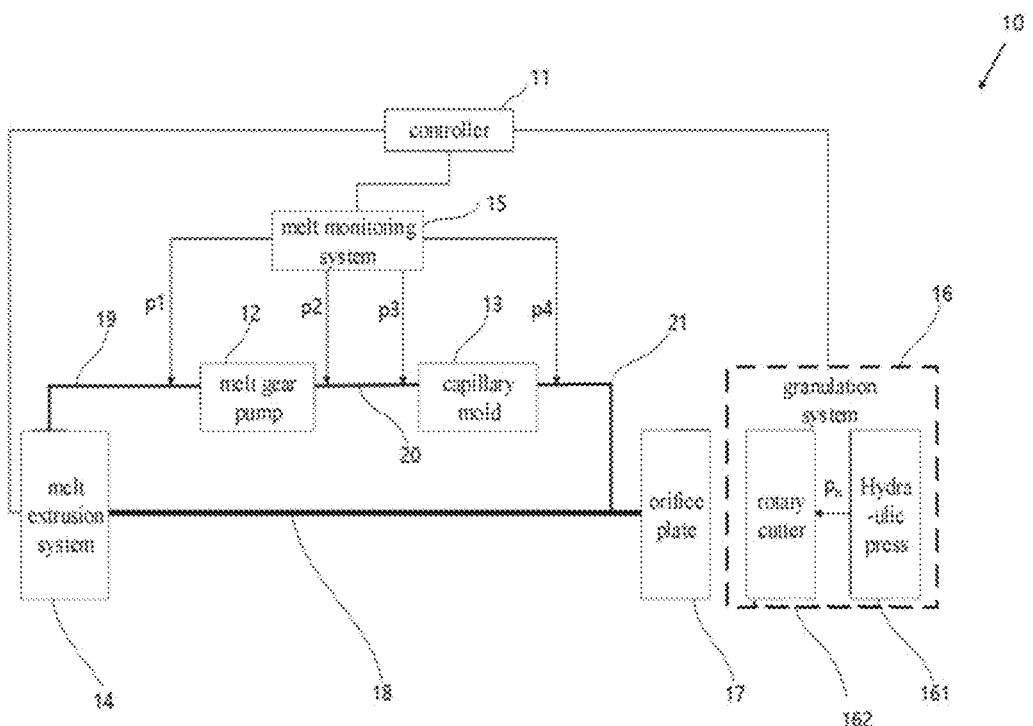
FIG. 2 is a schematic diagram of a granulation device for a crosslinked polyethylene cable insulating material having a voltage grade of at least 500 kV according to some embodiments.

FIG. 2 is a schematic diagram of a granulation device for a crosslinked polyethylene cable insulating material having a voltage grade of at least 500 kV according to the present disclosure.

As shown in FIG. 2, a granulation device 10 for a crosslinked polyethylene cable insulating material having a voltage grade of at least 500 kV is provided in an embodiment, including a controller 11, a melt gear pump 12, a capillary mold 13, a melt extrusion system 14, a melt monitoring system 15, a granulation system 16, an orifice plate 17, a main flow channel 18, a first branch flow channel 19, a second branch flow channel 20, and a third branch flow channel 21.

The controller 11 is electrically connected to each of the melt extrusion system 14, the melt monitoring system 15 and the granulation system 16, and is configured to control the melt extrusion system 14, the melt monitoring system 15 and the granulation system 16.

The melt extrusion system 14 is connected to the orifice plate 17 via the main flow channel 18 and is configured to extrude a melt into the orifice plate 17 through the main flow channel 18.

The melt extrusion system 14 is connected to the melt gear pump 12 via the first branch flow channel 19. The melt gear pump 12 is connected to the capillary mold 13 via the second branch flow channel 20. The capillary mold 13 merges into the main flow channel 18 via the third branch flow channel 21.

The melt monitoring system 15 includes four melt pressure sensors (not shown in FIG. 2), which are respectively configured to measure a melt pressure $p_1$ at an inlet of the melt gear pump 12, a melt pressure $p_2$ at an outlet of the melt gear pump 12, a melt pressure $p_3$ at an inlet of the capillary mold 13, and a melt pressure $p_4$ at an outlet of the capillary mold 13. The granulation system 16 includes a hydraulic press 161 and a rotary cutter 162.

Figure 3:
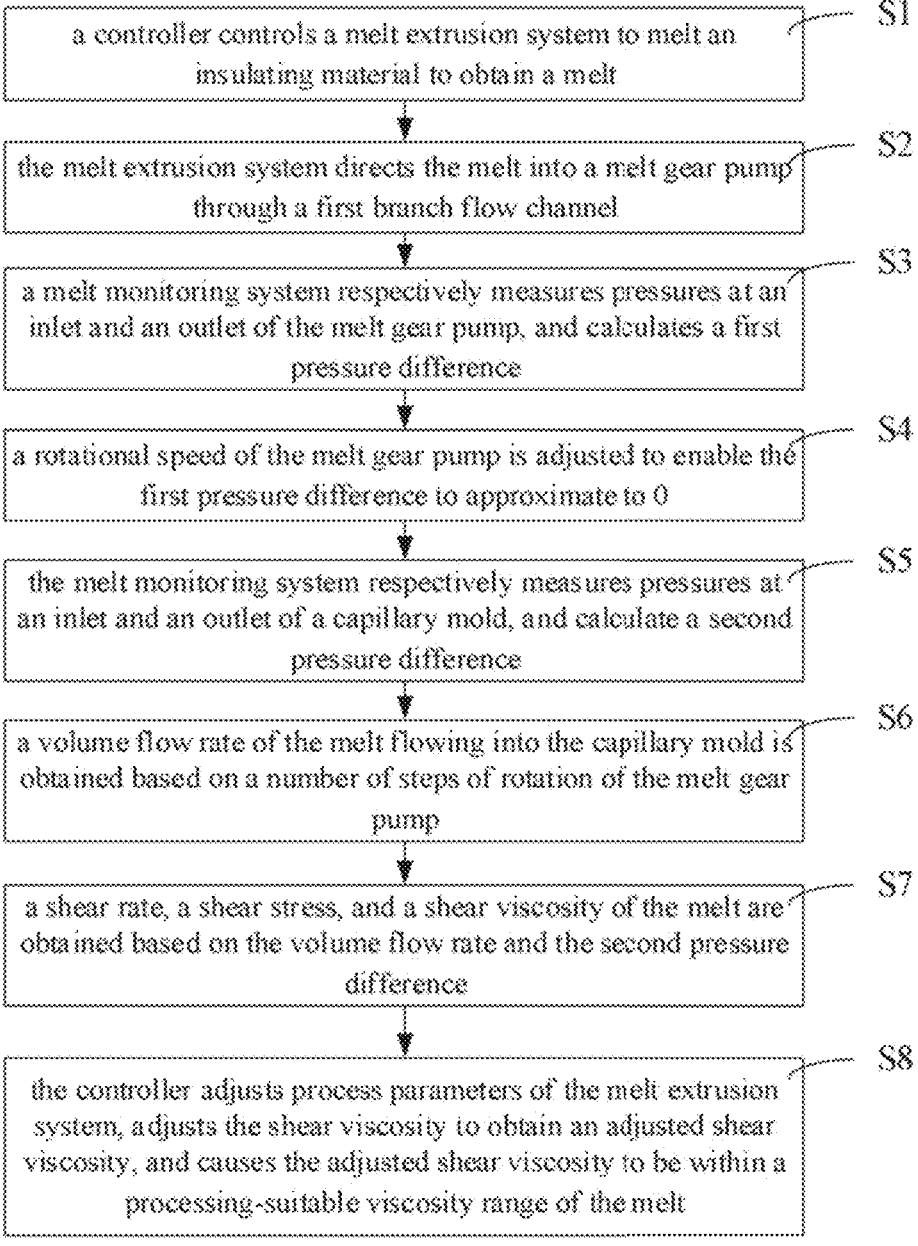
FIG. 3 is a flowchart of a granulation method for a crosslinked polyethylene cable insulating material having a voltage grade of at least 500 kV according to some embodiments.

A granulation method for a crosslinked polyethylene cable insulating material having a voltage grade of at least 500 kV is provided according to an embodiment, including a monitoring procedure and a granulation procedure. As shown in FIG. 3, the monitoring procedure includes steps 1 to 8 as follows.

In step 1, a controller 11 controls a melt extrusion system 14 to melt an insulating material to obtain a melt.

In step 2, the melt extrusion system 14 directs the melt into a melt gear pump 12 through a first branch flow channel 19.

In step 3, a melt monitoring system 15 respectively measures pressures at an inlet and an outlet of the melt gear pump 12, and calculates a first pressure difference $\Delta p_1$.

Before extrusion of the melt from an orifice plate 17, the melt is directed, through the first branch flow channel 19, into the metering melt gear pump 12 which is driven by a stepper motor. Two melt pressure sensors are respectively provided at the inlet and the outlet of the melt gear pump 12 to obtain a melt pressure $p_1$ at the inlet of the melt gear pump 12 and a melt pressure $p_2$ at the outlet of the melt gear pump 12 through measurement.

Then, a pressure difference $\Delta p_1$ of the melt passing through the melt gear pump 12 is obtained based on the following computational formula:

$$\Delta p_1 = p_2 - p_1.$$

In step 4, a rotational speed of the melt gear pump 12 is adjusted to enable $\Delta p_1$ to approximate to 0.

In step 5, the melt monitoring system 15 respectively measures pressures at an inlet and an outlet of a capillary mold 13, and calculate a second pressure difference $\Delta p_2$.

The melt outputted from the melt gear pump 12 continues to pass through the capillary mold 13 which has a diameter D=1.00±0.01 mm and a length L=40.0±0.1 mm. Two melt pressure sensors are provided at two ends of the capillary mold 13 to measure a melt pressure $p_3$ at the inlet of the capillary mold 13 and a melt pressure $p_4$ at the outlet of the capillary mold 13. Then, a pressure difference $\Delta p_2$ of the melt passing through the capillary mold 13 is obtained based on the following computational formula:

$$\Delta p_2 = p_4 - p_3.$$

After passing through these components, the melt merges back to the main flow channel 18 and enters a granulation mold.

In step 6, a volume flow rate Q of the melt flowing into the capillary mold 13 is obtained based on a number of steps of rotation of the melt gear pump 12.

As the rotational speed of the melt gear pump G is adjusted to enable $\Delta p_1$ to approximate to 0, the melt gear pump is kept running at the adjusted rotational speed. By counting the number of steps of the stepper motor per unit time, the volume flow rate Q (in unit of mm³/s) of the melt outputted by the melt gear pump can be measured. Such flow rate is a flow rate of the melt passing through the capillary mold 13.

In step 7, a shear rate $\dot{\gamma}$, a shear stress $\tau$, and a shear viscosity $\eta$ of the melt are obtained based on the volume flow rate Q and $\Delta p_2$ (in unit of MPa).

A computational formula for the shear rate $\dot{\gamma}$ (in unit of s⁻¹) of the melt is:

$$\dot{\gamma} = 10.19Q.$$

A computational formula for the shear stress $\tau$ (in unit of MPa) is:

$$\tau = \frac{\Delta P_2}{160}.$$

Then, the shear viscosity $\eta$ can be obtained based on the shear rate $\dot{\gamma}$ and the shear stress $\tau$. A computational formula for $\eta$ is:

$$\eta = \frac{\tau}{\dot{\gamma}}.$$

In step 8, the controller 11 adjusts process parameters of the melt extrusion system 14, adjusts the shear viscosity $\eta$ to obtain an adjusted shear viscosity $\eta'$, and causes $\eta'$ to be within a processing-suitable viscosity range of the melt.

Figure 4:
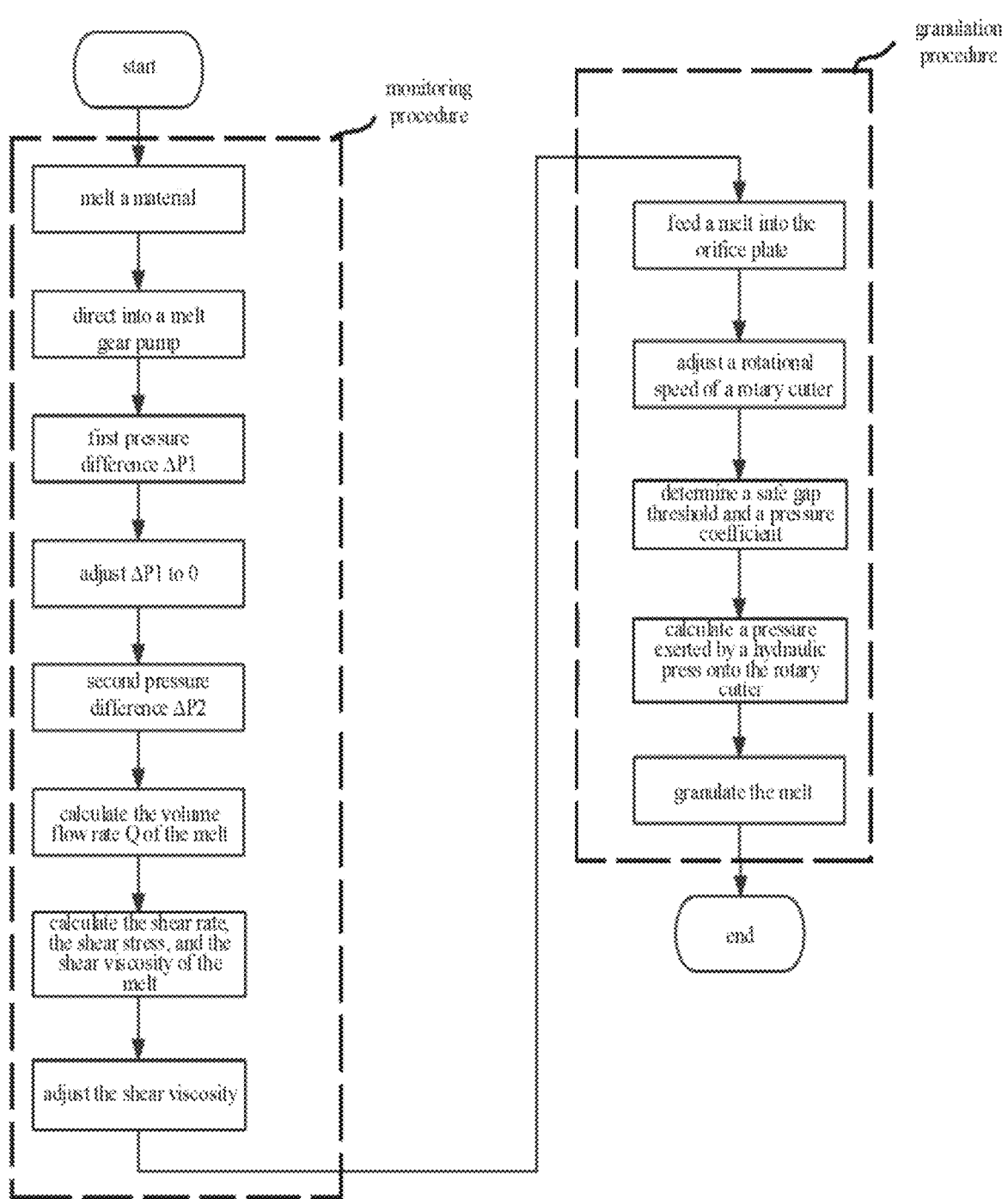
FIG. 4 illustrates flows of a granulation procedure for a crosslinked polyethylene cable insulating material having a voltage grade of at least 500 kV according to some embodiments.

FIG. 4 illustrates flows a granulation procedure for a crosslinked polyethylene cable insulating material having a voltage grade of at least 500 kV according to the present disclosure.

Figure 5:
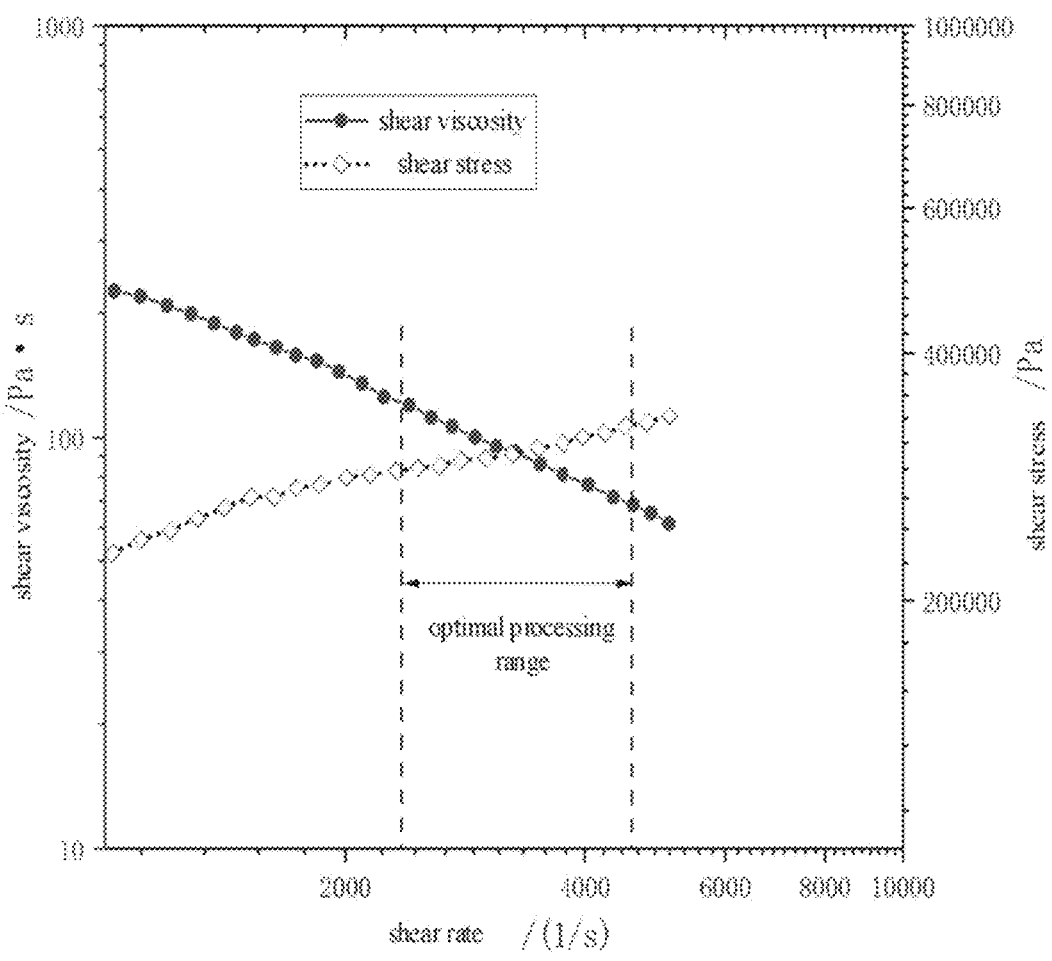
FIG. 5 illustrates a typical spectrum of shear viscosity of a melt according to some embodiments.

FIG. 5 is a typical spectrum of shear viscosity of the melt.

As shown in FIG. 5, the shear viscosity may be adjusted by changing process parameters such as a host screw rotational speed and a melt temperature. Typical data of spectrum of shear viscosity and an optimal parameter range for a basic resin used for manufacturing a crosslinked polyethylene cable insulating material having a voltage grade of at least 500 KV are shown in FIG. 5. An optimal viscosity range 477 may be determined through experiments, and process parameters for processing of the melt may be adjusted in real time during the manufacturing to keep the viscosity of the melt within the optimal viscosity range.

The granulation procedure includes steps 9 to 13 as follows.

In step 9, the melt extrusion system 14 feeds a melt to the orifice plate 17 via the main flow channel 18.

In step 10, a rotational speed n of a rotary cutter 162 in a granulation system 16 is adjusted according to $\eta'$.

The rotational speed n is obtained according to the following formula:

$$n = \frac{K}{\eta}$$

In the formula, K denotes a proportional coefficient. For a fixed material formulation and a fixed device, K may be determined based on a trial granulation experiment.

In step 11, trial extrusion is carried out to determine a safe gap threshold $\delta$ and a pressure coefficient $\varepsilon$.

In step 12, a pressure $p_h$ exerted by a hydraulic press 161 onto the rotary cutter 162 is obtained based on $\delta$, $\varepsilon$, and the pressure $p_4$ at the outlet of the capillary mold 13.

Figure 6:
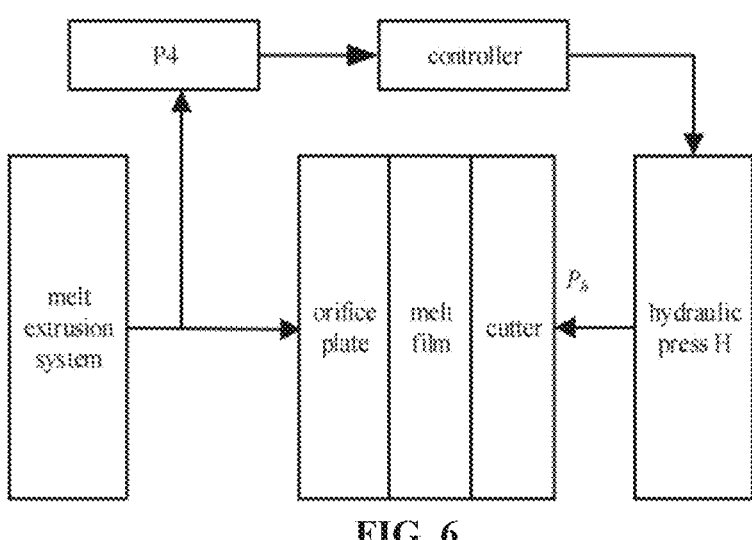
FIG. 6 is a schematic diagram of a gap control structure between a rotary cutter 162 and an orifice plate 17 according to some embodiments.

FIG. 6 is a schematic diagram of a gap control structure between a rotary cutter 162 and an orifice plate 17.

As shown in FIG. 6, a gap between the rotary cutter 162 and the orifice plate 17 is precisely controlled. The hydraulic press 161 exerts a certain pressure $p_h$ onto the head of the rotary cutter, to maintain an optimal gap between the rotary cutter 162 and the orifice plate 17. $p_h$ is adjusted in real time based on a measured value of a melt pressure sensor P4. $p_h$ is obtained according to the following formula:

$$P_h = \varepsilon(P_4 - \delta)$$

Coefficients $\varepsilon$ and $\delta$ may be determined based on trial extrusion experiments. $\delta$ denotes a safe gap threshold between the cutter head and the orifice plate 17, and $\delta$ needs to be carefully confirmed through repeated experiment, thus ensuring that the cutter head has no chance to have collision with the orifice plate 17 throughout the manufacturing.

In step 13, the pressure $p_h$ is exerted by the hydraulic press 161 onto the rotary cutter 162, so that a thin melt buffer layer exists between the rotary cutter 162 and the orifice plate 17, and the melt is granulated. Since the thin melt buffer layer always exists between the cutter head of the rotary cutter 162 and the orifice plate 17, collision between the cutter head and the orifice plate 17 can be prevented, and high-quality granulation can also be effectively carried out. Produced particles can have smooth surfaces, and the size of the particles is controllable and distribution of the size is uniform.

The present disclosure have following beneficial effects over the related technologies. In the present disclosure, the shear viscosity $\eta$ may be adjusted by changing process parameters such as a host screw rotational speed and a melt temperature, so that the shear viscosity $\eta$ is within an optimal viscosity parameter range. Thus, the crosslinked polyethylene cable insulating material having a voltage grade of at least 500 kV can be maintained in an optimal processing state during the granulation, and produced particles are of a uniform size and can meet requirements by subsequent optical inspection and processing. In addition, by adjusting the pressure $p_h$ of the hydraulic press, a thin melt buffer layer always exists between the rotary cutter and the orifice plate, which prevents collision between the cutter head and the orifice plate and can also effectively carry out high-quality granulation. The produced particles can have smooth surfaces and controllable sizes, and the sizes are distributed uniformly, thereby preventing the collision between the cutter and the orifice plate during the granulation and preventing reintroduction of impurity defects during the granulation. The present disclosure is applicable to crosslinked polyethylene cable insulating materials having voltage grade equal to or higher than 500 kV.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the present disclosure. It should be noted that those of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A granulation method for a crosslinked polyethylene cable insulating material having a voltage grade of at least 500 kV, comprising a monitoring procedure and a granulation procedure, wherein the monitoring procedure comprises:

step 1: controlling, by a controller, a melt extrusion system to melt an insulating material to obtain a melt;

step 2: directing, by the melt extrusion system, the melt into a melt gear pump through a first branch flow channel;

step 3: measuring, by a melt monitoring system, pressures at an inlet and an outlet of the melt gear pump respectively, and calculating, by the melt monitoring system, a first pressure difference $\Delta P_1$, $$\Delta p_1 = p_2 - p_1,$$

where $P_1$ denotes a melt pressure at the inlet of the melt gear pump, and $P_2$ denotes a melt pressure at the outlet of the melt gear pump;

step 4: adjusting a rotational speed of the melt gear pump to enable $\Delta P_1$ to approximate to 0;

step 5: measuring, by the melt monitoring system, pressures at an inlet and an outlet of a capillary mold respectively, and calculating, by the melt monitoring system, a second pressure difference $\Delta p_2$, $$\Delta p_2 = p_4 - p_3,$$

where $P_3$ denotes a melt pressure at the inlet of the capillary mold, and $P_4$ denotes a melt pressure at the outlet of the capillary mold;

step 6: obtaining a volume flow rate Q of the melt flowing into the capillary mold based on a number of steps of rotation of the melt gear pump;

step 7: obtaining a shear rate $\dot{\gamma}$, a shear stress t, and a shear viscosity $\eta$ of the melt based on the volume flow rate Q and $\Delta P_2$; and step 8: adjusting, by the controller, process parameters of the melt extrusion system, adjusting, by the controller, the shear viscosity $\eta$ to obtain an adjusted shear viscosity $\eta'$, and causing $\eta'$ to be within a processing-suitable viscosity range of the melt;

wherein the granulation procedure comprises:

step 9: feeding, by the melt extrusion system, the melt to an orifice plate through a main flow channel;

step 10: adjusting a rotational speed n of a rotary cutter in a granulation system according to $\eta'$, step 11: carrying out trial extrusion to determine a safe gap threshold $\delta$ and a pressure coefficient $\varepsilon$;

step 12: obtaining a pressure $P_h$ exerted by a hydraulic press onto the rotary cutter based on $\delta$, $\varepsilon$, and the pressure $P_4$ at the outlet of the capillary mold; and step 13: exerting, by the hydraulic press, the pressure $P_h$ onto the rotary cutter to enable a thin melt buffer layer existing between the rotary cutter and the orifice plate, and granulating the melt.

2. The granulation method according to claim 1, wherein a computational formula for the shear rate $\dot{\gamma}$ of the melt in step 7 is:

$\dot{\gamma}=10.19$ Q.

3. The granulation method according to claim 1, wherein a computational formula for the shear stress $\tau$ in step 7 is:

$$\tau = \frac{\Delta P_2}{160}.$$

4. The granulation method according to claim 1, wherein a computational formula for the shear viscosity $\eta$ in step 7 is:

$$\eta = \frac{\tau}{\dot{\gamma}}.$$

5. The granulation method according to claim 1, wherein process parameters in step 8 comprise a host screw rotational speed and a melt temperature.

6. The granulation method according to claim 1, wherein the rotational speed n of the rotary cutter in step 10 is obtained according to the following formula:

$$n = \frac{K}{\eta}$$

where K denotes a proportional coefficient, and K is determined according to a trial granulation experiment.

7. The granulation method according to claim 1, wherein $P_h$ in step 12 is obtained according to the following formula:

$$P_h = \varepsilon(P_4 - \delta).$$

8. The granulation method according to claim 1, wherein the capillary mold has a diameter D ranging from 0.99 mm to 1.01 mm and a length L ranging from 39.9 mm to 40.1 mm.

9. A granulation device for a crosslinked polyethylene cable insulating material having a voltage grade of at least 500 kV, used in the granulation method according to claim 1, comprising: a controller, a melt gear pump, a capillary mold, a melt extrusion system, a melt monitoring system, a granulation system, an orifice plate, a main flow channel, a first branch flow channel, a second branch flow channel, and a third branch flow channel;

wherein the controller is electrically connected to each of the melt extrusion system, the melt monitoring system and the granulation system, and is configured to control the melt extrusion system, the melt monitoring system and the granulation system;

the melt extrusion system is connected to the granulation system via the main flow channel, and is configured to extrude a melt into the orifice plate through the main flow channel;

the melt extrusion system extrudes the melt into the melt gear pump through the first branch flow channel, the melt gear pump extrudes the melt into the capillary mold through the second branch flow channel, and the capillary mold extrudes the melt into the main flow channel through the third branch flow channel;

the melt monitoring system is configured to respectively measure pressures at an inlet and an outlet of the melt gear pump and pressures at an inlet and an outlet of the capillary mold; and the granulation system is configured to granulate the melt, and the granulation system comprises a hydraulic press and a rotary cutter;

wherein the hydraulic press is electrically connected to the controller and is configured to provide a set hydraulic pressure for the rotary cutter, and the rotary cutter rotates and granulates the melt flowing out of the orifice plate.

\* \* \* \* \*